April 18, 1944.   J. S. LARKINS, JR   2,346,690
DUST TEST MACHINE
Filed Feb. 10, 1943   2 Sheets-Sheet 1

INVENTOR
JOHN S. LARKINS JR.
BY
ATTORNEYS

April 18, 1944.   J. S. LARKINS, JR   2,346,690
DUST TEST MACHINE
Filed Feb. 10, 1943   2 Sheets-Sheet 2
FIG.2
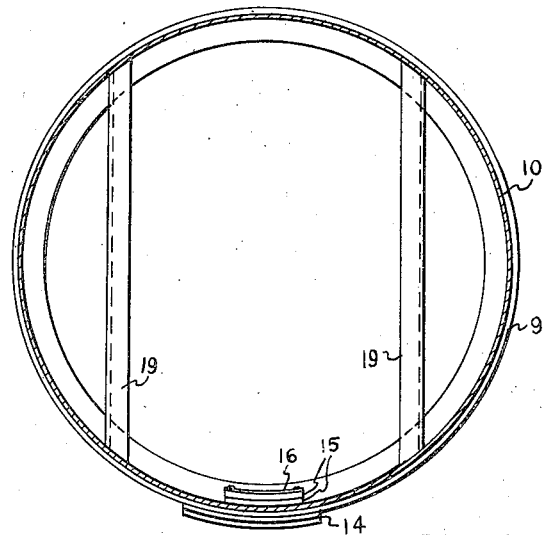
FIG.5
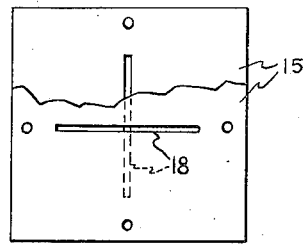
FIG.4
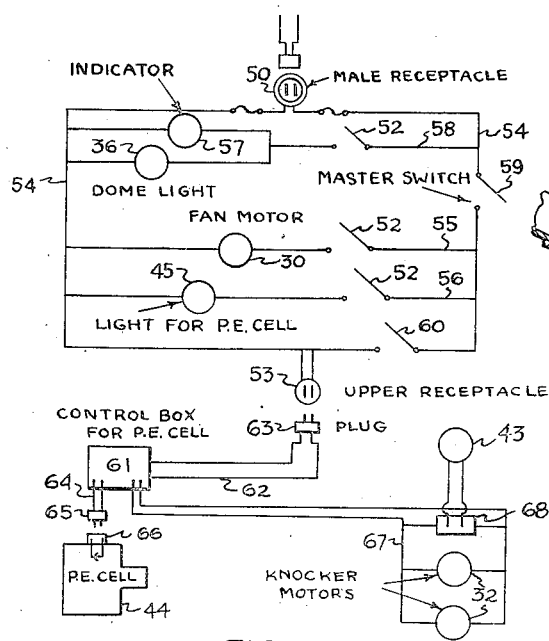
FIG.6
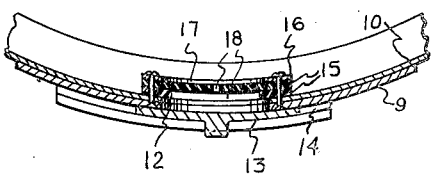
FIG.3
INVENTOR
JOHN S. LARKINS JR.
BY
C.E. Herrstrom & W.E. Thibodeau
ATTORNEYS Patented Apr. 18, 1944

2,346,690

UNITED STATES PATENT OFFICE 2,346,690

DUST TEST MACHINE

John S. Larkins, Jr., Detroit, Mich.

Application February 10, 1943, Serial No. 475,461

15 Claims. (Cl. 73—51)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel machine for performing a dust test on electric apparatus such as relays, solenoids, switches, generators, motors, voltmeters, ammeters, other electrical instruments and the like.

The specifications on such apparatus often require that the part be able to withstand exposure in dust-laden air of given concentration for a given length of time. It has been customary to place the piece in a chamber and circulate the dust-laden air there therethrough. Unless the apparatus is properly designed, it will lead to inaccuracies in the tests. If the chamber is not air tight, the dust concentration will gradually diminish through the leaks. On the other hand, if the chamber is made air tight, the pressure therein will be other than atmospheric.

The principal object of this invention is to provide a testing apparatus in which atmospheric pressure is maintained and in which there is replenishment of the air lost through the leaks. In the accomplishment of this object, the housing or a portion thereof is resiliently mounted and provided with means for vibrating it. The vibrating mechanism is controlled by a photoelectric cell or other electronic device dependent for its operation on a reduction of the dust density within the chamber. The vibration releases the dust that has deposited on the walls or other parts of the chamber. This may be sufficient to restore the specified dust concentration. If not, an auxiliary dust supplying device goes into operation after a given interval of vibration. This mechanism preferably comprises a hopper having a screw feed into the chamber. It is operated by motor connected into the circuit that energizes the vibration means, with a delaying mechanism interposed. Thus, the auxiliary supply does not become operative unless the vibration alone does not add a sufficient quantity of dust to the stream.

The apparatus further includes a distributing device such as a fan for spreading the dust-laden air uniformly through the chamber. Also included in the apparatus are a sight window and a lamp for illuminating the interior.

The invention is fully disclosed by way of example in the following description and in the accompanying drawings in which:

Figure 2 is a section on the line 2—2 of Figure 1;

Figure 3 is a section on the line 3—3 of Figure 1;

Figure 4 is a detail elevation, partly broken away, of the door seal;

Figure 5 is a detail section on the line 5—5 of Figure 1, and

Figure 6 is a wiring diagram.

Figure 1:
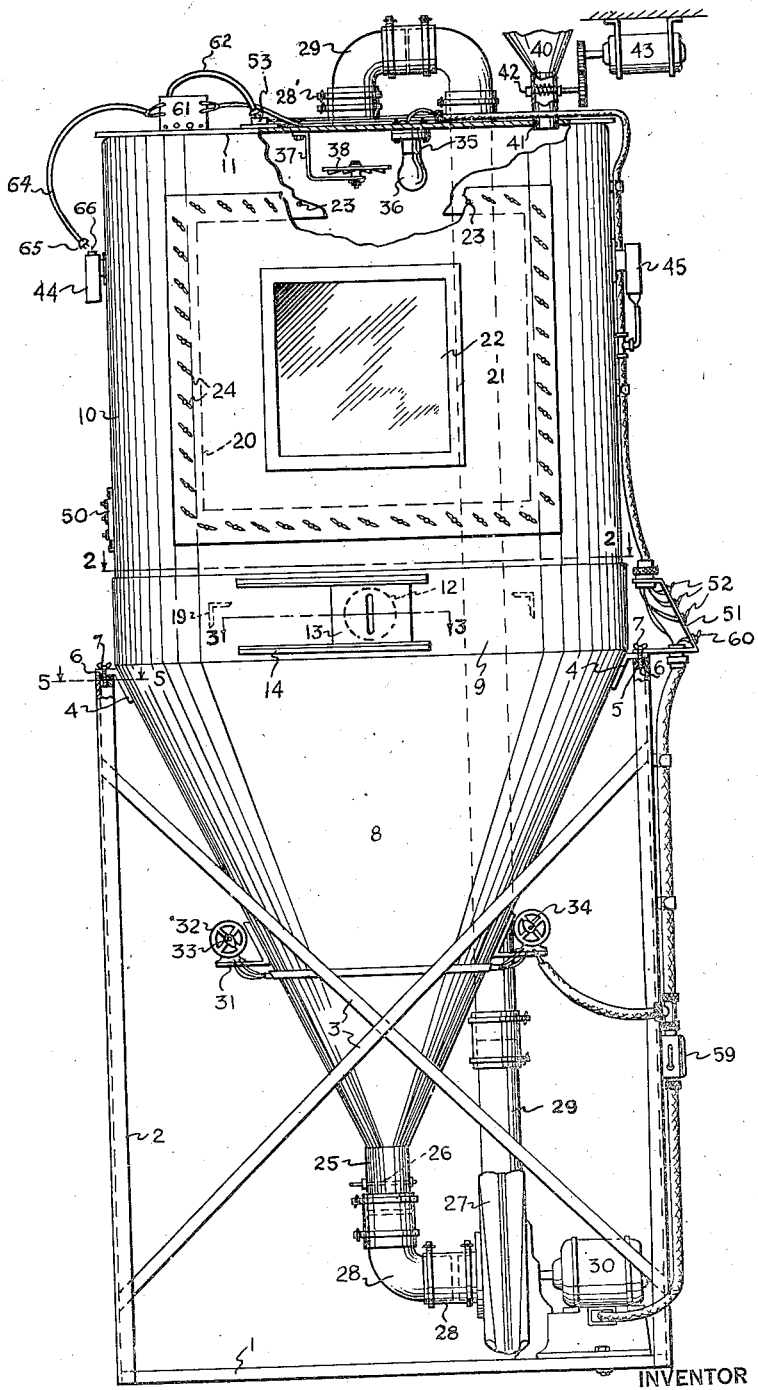
Figure 1 is a vertical elevation of this device.

With reference to the drawings by corresponding characters, Figures 1 and 2 show a supporting frame of suitable construction embodying in this case a base frame 1 and a number of uprights 2 secured thereon. Cross braces 3 are provided wherever necessary. On the upper end of the uprights are mounted angular brackets 4 with a rubber block 5 beneath each bracket. The brackets and blocks are secured by bolts 6 and wing nuts 7 or other appropriate means. A conical hopper 8 is secured to and suspended from the brackets for a purpose which will presently be described.

A cylindrical rim 9 is fitted upon and secured to the upper edge of the hopper and in turn supports a cylindrical housing 10. These parts may conveniently be welded together in edge to edge relation. The bottom of the housing 10 is open through the rim 9 to the hopper 8, and the top is closed by a plate 11 except at points to be indicated.

The rim 9, which may be considered a portion of the housing 10, is formed with an access opening 12 normally closed by a door 13 sliding in tracks 14. Between the door and the rim are inserted a pair of rubber gaskets 15, clamped against the rim by a metal plate 16 having an opening 17 registering with the opening 12. The door 13 slides against the rim 9. Each gasket 15 has a slit 18, and the gaskets are so arranged that their slits are perpendicular to each other. When the door is slid away from the opening 17, an article to be tested can be pushed through the gaskets, or withdrawn with only a comparatively small loss of air from the apparatus. A pair of angle irons 19 secured across the rim constitute the support for the test pieces. The vertical wall of the housing 10 has a large opening 20 normally covered by a plate 21 having a window 22. The plate is secured in any suitable manner as by means of bolts 23 and wing nuts 24.

To the lower end of the cone 8 is attached a cylinder 25 in which is mounted a manually adjustable valve such as a butterfly valve 26. A blower 27 is connected to the cylinder 25 by suitable fittings 28 and similarly into the top of the housing 10 by tubing 29 and fittings 28'. The blower is driven by an electric motor 30.

For the purpose of vibrating the member 8 under certain conditions, this member has secured thereto a pair of brackets 31 on each of which is secured an electric motor 32. The shaft 33 of each motor carries one or a pair of eccentric weights 34 which, on operation of the motors, cause the hopper assembly and the housing 10 to vibrate on the rubber mountings 5. To accommodate this motion, some of the fittings 28', are made of rubber.

Near the center of the top of plate 11 is secured a lamp socket 35 carrying a lamp 36 to illuminate the interior of the housing 10 for view through the window 22. A bracket 37 is secured to the lower surface of the plate 10 and carries a horizontally disposed fan 38, located preferably directly beneath the connection of the fittings 28' to the top plate. The current of dust-laden air projected against the fan will cause the latter to rotate and to distribute the air uniformly over the housing rather than force it in a concentrated stream upon the test pieces. The distributed flow more nearly resembles the normal atmospheric condition in which the test piece is to be used.

In the operation of the device as thus far described, a predetermined quantity of dust is introduced into the apparatus, calculated with respect to the volume of the apparatus to produce a given concentration. Inasmuch as the test should be conducted at atmospheric pressure, the system is not made air tight. Ordinarily, dust would be lost through the leaks, and the accuracy of the test would suffer accordingly. One of the purposes of the invention, as stated above, is to maintain the specified dust concentration.

Accordingly, the top of the housing supports a hopper 40 containing a quantity of dust and communicating with the interior of the housing at 41. In the bottom of the hopper is provided a screw feed 42 actuated by a motor 43.

The motor is controlled from a photoelectric cell 44 mounted on the wall of the housing 10. Opposite the cell is an electric light 45 also supported on the housing and projected at the cell. The cell is sensitized to pass current when the density of the dust-laden air falls below a predetermined value. The first effect of the cell circuit is to run the motors 32 and next, after an interval of time, to actuate the screw feed 42. The electrical apparatus for this operation will now be described.

On the housing 10 is mounted a terminal block 50 for the current input. One of the brackets 4 has secured thereto a switchboard 51 carrying individual switches 52 for the several electrical parts already mentioned. It will be assumed, without specific mention, that the various circuits are controlled by separate switches 52. A receptacle 53 on the plate 11 is connected in parallel with terminals on the block 50 by conductors 54. The blower motor 30 and the light source 45 are connected across the line respectively at 55 and 56 as shown in the wiring diagram, Figure 5. The dome light 36 and a suitable indicator 57 are connected in series with each other and together across the line at 58. A master switch 59 in the line controls the fan motor 30 and light source 45, and another switch 60 beyond these parts controls the receptacle 53.

A control box 61 mounted on the top plate 11 or elsewhere contains a suitable relay, preferably electronic, and receives current through a cord 62 having a plug 63 normally inserted in the receptacle 53. The low current side of box connects to the cell 44 through a cord 64, plug 65 and receptacle 66.

The output side of the box 61 feeds a parallel circuit 67 across which are connected the knocker motors 32. Across from the circuit is also connected a timer or delaying mechanism 68 governing the operation of the motor 43 for the screw 42.

It has already been pointed out that the first result of activation of the cell 44 is to operate the knocker motors 32 and vibrate the hopper 8. Any dust that has deposited on the sides of the hopper or in cracks and corners within the apparatus is thereby shaken loose and returned to the circulating stream. If sufficient dust is not added by this means to restore the stream to proper concentration and dust density within the interval of time for which the timer 68 has been set, the motor 43 will operate the screw 42 and introduce dust into the apparatus from the hopper 40. In either case, when the proper concentration has been reached, the cell 44 will open the circuit of the motors 32 and timer 68. If this circuit opens before the timer permits the motor 43 to operate, the latter will, of course, not operate since it depends on the circuit 67 being closed.

Although a specific embodiment of the invention has been illustrated and described, it will be understood that the structural characteristics of the apparatus may be changed considerably and that the invention resides broadly in the combination of parts set forth in the annexed claims.

What I claim is:

1. A dust test machine comprising a housing forming a test chamber and having a resiliently supported portion, means for vibrating said portion, means for circulating air between said portion and another part of said chamber, and means operable by the dust concentration in said chamber for controlling the operation of said vibrating means.

2. A dust test machine comprising a housing forming a test chamber and having a resiliently supported portion, means for vibrating said portion, means for circulating air between said portion and another part of said chamber, and a photoelectric cell connected with and controlling said vibrating means, said cell being exposed to said chamber and sensitized to the dust concentration therein.

3. A dust test machine comprising a housing forming a test chamber and having a resiliently supported portion, means for vibrating said portion, means for circulating air between said portion and another part of said chamber, means operable by the dust concentration in said chamber for controlling the operation of said vibrating means, and an air distributing device in said chamber at its connection with said circulating means.

4. A dust test machine comprising a housing forming a test chamber and having a resiliently supported portion, means for vibrating said portion, means for circulating air between said portion and another part of said chamber, and means operable by the dust concentration in said chamber for controlling the operation of said vibrating means, a dust supplying means connected to said chamber, and means rendering the operation of said supplying means dependent on said vibration means.

5. A dust test machine comprising a housing forming a test chamber and having a resiliently supported portion, means for vibrating said portion, means for circulating air between said portion and another part of said chamber, and means operable by the dust concentration in said chamber for controlling the operation of said vibrating means, a dust supplying means connected to said chamber, and means rendering the operation of said supplying means dependent on said vibration means, and a delaying device operative on said supplying means to postpone the operation thereof for a time interval after the operation of said vibration means.

6. A dust test machine comprising a housing forming a test chamber and having a resiliently supported portion, a motor for vibrating said portion, means for circulating air between said portion and another part of said chamber, and means operable by the dust concentration in said chamber for controlling the operation of said motor.

7. A dust test machine comprising a housing forming a test chamber and having a resiliently supported portion, means for vibrating said portion, means for circulating air between said portion and another part of said chamber, means operable by the dust concentration in said chamber for controlling the operation of said vibrating means, and a fan in said chamber adapted to distribute air throughout the chamber.

8. A dust test machine comprising a housing forming a test chamber and having a resiliently supported portion, a motor for vibrating said portion, means for circulating air between said portion and another part of said chamber, means operable by the dust concentration in said chamber for controlling the operation of said motor, a dust supplying means connected to said chamber, and a motor for operating said supplying means and connected in the same circuit with the first named motor.

9. A dust test machine comprising a housing forming a test chamber and having a resiliently supported portion, a motor for vibrating said portion, means for circulating air between said portion and another part of said chamber, means operable by the dust concentration in said chamber for controlling the operation of said motor, a dust supplying means connected to said chamber, a motor for operating said supplying means and connected in the same circuit with the first named motor, and a delaying device operative on the second named motor to postpone the operation thereof for a time interval after the operation of the first named motor.

10. A dust test machine comprising a housing forming a test chamber, means for vibrating said housing, means for circulating air through said housing, and means operable by the dust concentration in said chamber for controlling the operation of said vibrating means.

11. A dust test machine comprising a housing forming a test chamber, means for vibrating said housing, means for circulating air through said housing, means operable by the dust concentration in said chamber for controlling the operation of said vibrating means, means for supplying dust to said chamber, and means rendering the operation of said supplying means dependent on said vibrating means.

12. A dust test machine comprising a housing forming a test chamber, means for vibrating said housing, means for circulating air through said housing, and a photoelectric cell connected with and controlling said vibrating means, said cell being exposed to said chamber and sensitized to the dust concentration therein.

13. A dust test machine comprising a housing forming a test chamber, means for vibrating said housing and a photoelectric cell connected with and controlling said vibrating means, said cell being exposed to said chamber and sensitized to the dust concentration therein.

14. A dust test machine comprising a housing forming a test chamber, means for vibrating said housing, means for circulating air through said housing, a photoelectric cell connected with and controlling said vibrating means, said cell being exposed to said chamber and sensitized to the dust concentration therein, means for supplying dust to said chamber, and means rendering the operation of said supplying means dependent on said vibrating means.

15. A dust test machine comprising a housing forming a test chamber, means for vibrating said housing, means for circulating air through said housing, means operable by the dust concentration in said chamber for controlling the operation of said vibrating means, means for supplying dust to said chamber, means rendering the operation of said supplying means dependent on said vibrating means, and a delaying device operative on said supplying means to postpone the operation thereof for a time interval after the operation of said vibration means.

JOHN S. LARKINS, Jr.